Feb. 6, 1923.
C. E. GRIFFITHS.
FILM WINDER FOR FILM CAMERAS.
FILED JULY 20, 1921.
1,444,682.
2 SHEETS—SHEET 1.
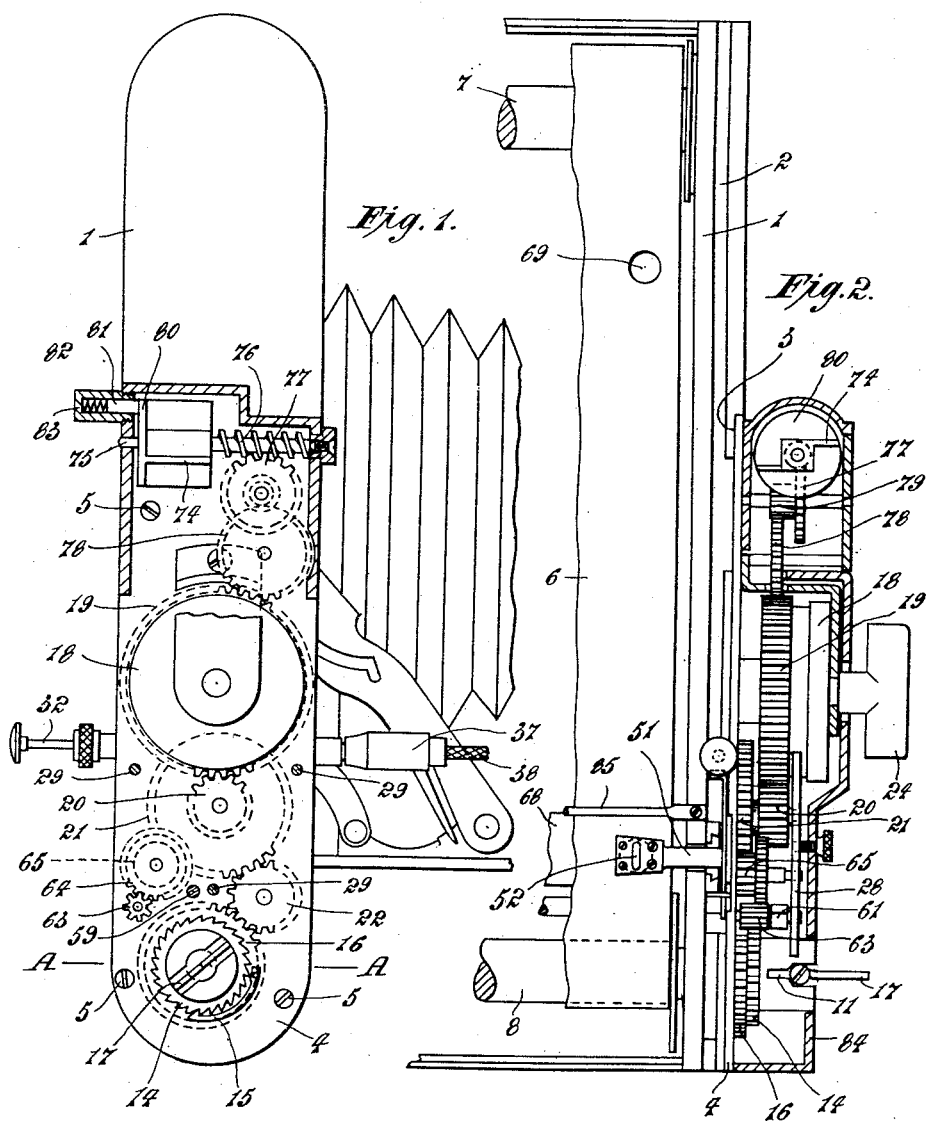

Feb. 6, 1923.
C. E. GRIFFITHS.
FILM WINDER FOR FILM CAMERAS.
FILED JULY 20, 1921.
1,444,682.
2 SHEETS—SHEET 2.
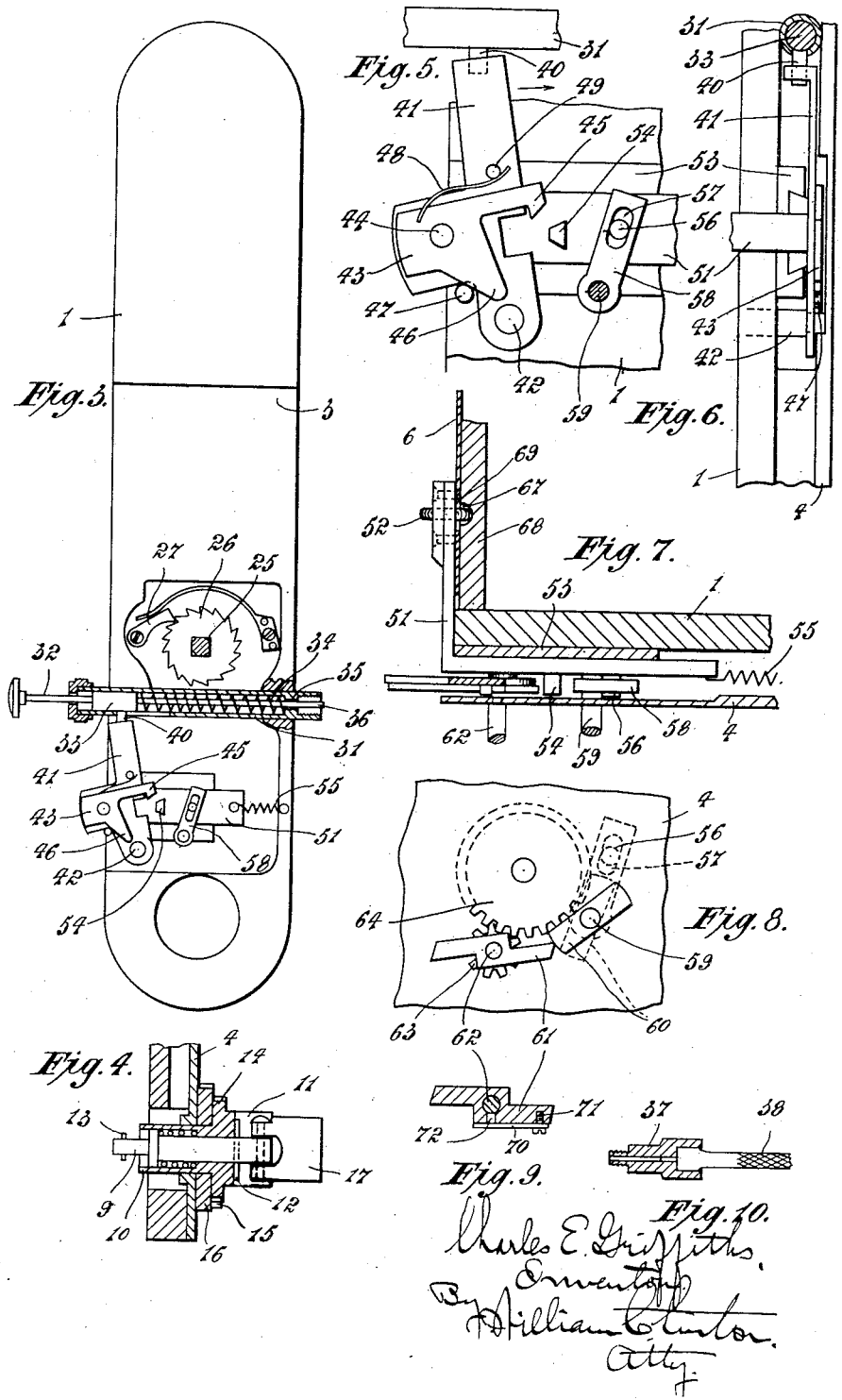

Patented Feb. 6, 1923.

1,444,682

UNITED STATES PATENT OFFICE.

CHARLES ERNEST GRIFFITHS, OF WELLINGTON, NEW ZEALAND.

FILM WINDER FOR FILM CAMERAS.

Application filed July 20, 1921. Serial No. 486,314.

*To all whom it may concern:*

Be it known that I, CHARLES E. GRIFFITHS, a subject of the King of Great Britain and Ireland, residing at Wellington, in the Dominion of New Zealand, have invented certain new and useful Improvements in Film Winders for Film Cameras; and I do hereby declare that the following is a full, clear, concise, and exact description of the invention, such as will enable others skilled in the art to which it appertains to make and use the same.

This invention relates to film cameras and provides means whereby the film immediately after an exposure has been made, is automatically wound upon its spool the distance sufficient to bring an unexposed portion of the film into position and the film is retained in such position until another exposure has been made, thus preventing two or more exposures being made on the same portion of the film.

An approved form of carrying out this invention and the operation thereof will be described with reference to the accompanying drawings, wherein:—

Figure 1, is a side elevation of the folding type of camera parts being shown in section to illustrate a portion of the mechanism.

Figure 2, is a rear elevation, parts being shown in section.

Figure 3, is a view of a side upon which a portion of the mechanism is carried.

Figure 4, is a cross section on line 4—4, Figure 1.

Figure 5, is an enlarged detail of some of the parts shown in Figure 3.

Figure 6, is a rear view of the parts shown in Figure 5.

Figure 7, is a sectional view on line 7—7 of Figure 5.

Figure 8, a side view of the releasing mechanism but drawn to a larger scale than the preceding views.

Figure 9, is a section of a detail, but also drawn to larger scale.

Figure 10, is a cross-section of another detail.

The side plate 1 of the camera having the usual recess 2 to receive the cover, is preferably made of metal such as aluminium. This plate is recessed at 3 to receive a plate 4 upon which the greater part of the mechanism is mounted, such plate being attached to the plate 1 by screws 5. The film 6 is held upon the spools 7 and 8 in the usual way, the spool 8 fitting upon a spindle 9 (see Figure 4) retained in a sleeve 10 notched at 11 to receive a pin 12 in the spindle 9, such spindle 9 engaging with the usual slot in the end of the spool by means of the pin 13. The sleeve has an integral ratchet wheel 14, while a spring ratchet 15 (see Figure 1) is fixed at one end to a wheel 16 loosely mounted on the sleeve so that the spool may be rotated by means of the wing 17 without rotating the toothed wheel 16.

The spool is driven from a clock spring contained in a drum 18 through the medium of a toothed wheel 19 upon the periphery of the drum and toothed wheels 20, 21 and 22, the latter gearing with the wheel 16. The drum and spring are of ordinary construction and are wound by means of a wing 24, the spindle 25 having a ratchet wheel 26 held by a spring operated ratchet 27. The toothed wheels 20, 21 and 22 have their spindles journalled in the plate 4 and in a plate 28 supported on posts 29 secured in the plate 4.

The winding mechanism is operated and controlled by the following releasing and locking mechanism (see Figures 1 to 8).

A cylinder 31 is mounted in the plate 1 and contains a push pin 32 having a piston 33 normally held in its outer position by a coil spring 34 in compression between the piston and a shoulder 35 in the cylinder. The end 36 of the push pin is adapted to enter a sleeve 37 (see Figures 1 and 10) threaded into the end of the cylinder and containing the end of the usual antinous release cord 38, so that when the pin is pushed in it will operate the shutter. The piston 33 has a pin 40 projecting through a slot in the cylinder 31 and engaging the end of a lever 41 pivoted on a pin 42 fixed in the plate 1. A detent 43 is pivoted upon a pin 44 fixed in the lever 41. This detent has a catch 45 and tail 46 which is normally retained against a pin 47 projecting from the plate 1 by means of a spring 48 fixed in a saw-cut in the top edge of the detent and bearing beneath a pin 49 projecting from the lever 41. A sliding member 51, right-angled as shown, carries upon one end thereof a roller 52 for the purpose presently to be described, its other end being dovetailed and slideable in a guide 53 fixed to the plate 1. A pin 54 projects from the member 51 with which the catch 45 of the detent is adapted to engage. A spring 55 normally retains the member 51 in the position shown in the figures. A pin 56 projects from the member 51 and engages a slot 57 on an arm 58 fixed to a pin 59 which is journalled in the plate 4 and in the plate 29. Such pin has fixed to it a stop 60 against which contacts a fly 61 mounted upon a spindle 62 having a pinion 63 which gears with a toothed wheel 64 driven from the wheel 21 through the medium of a pinion 65. The roller 52 upon the member 51 drops into a recess 67 in a cross bar 68 of the camera and the film 6 is provided with holes 69 at intervals corresponding to the portions to be exposed into which holes the roller 52 passes and normally lies within the recess 67.

Upon the pin 32 being pushed inwards, the lever 41 will be carried in the direction of the arrow in Figure 5, and the tail 46 of the detent 43, moving away from the pin 47, will permit the catch 45, under pressure of its spring 48, to engage behind the pin 54. The end 36 of the push pin 32 will operate the shutter of the camera to make the required exposure, and immediately the push-pin is released the coil spring 34 will return it to its normal position, carrying back with it the lever 41. As the lever 41 moves back the catch 45 will carry back the member 51 by means of the pin 54, while the pin 56 will carry with it the arm 58 thereby rotating the stop 60 in the direction of the arrow, until such stop is clear of the fly 61 thereby permitting the train of wheels to operate and rotate the spool 8, and since the wheel 52 will also have been moved out of the recess 67 and clear of the hole 69 in the film, such film can move forward and be wound upon the spool. As the lever 41 approaches its normal position the pin 47 will cause the detent 43 to disengage the catch 45 from the pin 54, thereby permitting the member 51 to return to its normal position by means of its spring 55, but since the film will now lie between the roller 52 and the recess 67 the member 51 cannot return to its normal position until the next hole 69 has reached the recess. Immediately this occurs the roller will drop into the recess 67 and the lever will return to its normal position and again bring the stop 60 to the position shown in full lines in Figure 8, when the fly 61 will contact with the edge of the stop and prevent further movement of the train of wheels and of the film until the push pin is again operated.

In order to take up the shock of the sudden stoppage of the train of wheels, the fly 61 (see Figure 9) is mounted upon its spindle 62 by means of a spring leaf 70 secured by a screw 71 to an arm of the fly the leaf having a pin 72 bearing upon the spindle 62.

The speed of the film is checked by governing gear consisting of a fly having wings 74 mounted upon a spindle 75 journalled in a casing secured to the plate 4. The spindle 75 has a worm 76 with which gears a worm wheel 77 driven from the wheel 19 through the medium of a wheel 78 and pinion 79. A disc 80 at the end of the wings has bearing against it a stop 81 under the tension of a spring 82 in a housing 83.

The film is inserted beneath a cross-bar 85 acting as a guide.

The mechanism is enclosed by a cover 84.

The sleeve 37 rotates upon the end of the release cord 38 so that it can be easily attached and detached from the cylinder 31.

What I claim is:—

1. In a film camera, spring operated means to wind the film upon a spool, locking means whereby the spring means are normally kept locked, means to operate the shutter of the camera and release the said locking means, and a slidable member normally engaging a portion of the film and adapted to be released by said locking means to permit a portion of the film to be wound on the spool.

2. In a film camera, spring operated means to rotate the spool and wind the film thereon, a slidable plate adapted to engage a portion of the film to prevent movement of the film, means to lock said winding means, said plate co-acting with said locking means, means to release said plate and said locking means upon the operation of the shutter of the camera and permit the spool to be rotated, and means to bring the locking means into action immediately the said film engaging means engages the film.

3. In a film camera, spring driving means to rotate the spool and wind the film thereon, a slidable plate adapted to engage the film and prevent it having movement, means for operating the shutter of a camera, a lever operated by the said means for operating the shutter, a member carrying said slidable plate, locking means controlled by said member for locking the spring driving means, means on said lever to engage said member when said lever is operated, means to release the locking means when the means on said lever engage said member, and means to disengage the said means on said lever from said member when said shutter operating means returns to its normal position and again lock the winding means.

4. In a film camera, a film spool, a shutter spring driving means to rotate the spool and to wind the film thereon, operating means for operating the shutter, a lever controlled by said operating means, a detent pivoted on said lever, a sliding member, means on said sliding member to engage the film, a pin projecting from said member with which said detent is adapted to engage, said detent so arranged that it will engage said pin when the said lever moves forward and carry back said sliding member when the lever returns, and will release said sliding member when the lever returns to its normal position, a pin projecting from said sliding member, an arm with which said pin engages, a spindle to which said arm is fixed, said spindle carrying a stop adapted to stop and to release said winding means, substantially as set forth.

5. In a film camera, a film spool, a shutter spring means to wind the film upon a spool, locking means whereby the spring means are normally kept locked, means to operate the shutter of the camera and immediately thereafter to release the said locking means, and means which upon the release of the said locking means will permit a portion of the film to be wound upon the spool, governing gear consisting of a fly having a disc upon one end thereof, and a spring stop engaging against said disc, said fly and disc being driven from said winding means, substantially as set forth.

In witness whereof I have hereunto set my hand in the presence of two subscribing witnesses.

CHARLES ERNEST GRIFFITHS.

Witnesses:
C. E. WADDINGHAM,
W. R. WORSLEY.